(12) United States Patent
Gordon et al.

(10) Patent No.: US 10,170,798 B2
(45) Date of Patent: Jan. 1, 2019

(54) MODERATE TEMPERATURE SODIUM BATTERY

(75) Inventors: John Howard Gordon, Sale Lake City, UT (US); Javier Alvare, Cottonwood Heights, UT (US)

(73) Assignee: FIELD UPGRADING USA, INC., Madison, WI (US)

( * ) Notice: Subject to any disclaimer, the term of this patent is extended or adjusted under 35 U.S.C. 154(b) by 599 days.

(21) Appl. No.: 13/307,123

(22) Filed: Nov. 30, 2011

(65) Prior Publication Data

US 2012/0141856 A1    Jun. 7, 2012

Related U.S. Application Data

(60) Provisional application No. 61/418,749, filed on Dec. 1, 2010.

(51) Int. Cl.
*H01M 10/39* (2006.01)
*H01M 4/70* (2006.01)

(52) U.S. Cl.
CPC .......... *H01M 10/399* (2013.01); *H01M 4/70* (2013.01); *H01M 10/3954* (2013.01); *Y10T 29/49108* (2015.01)

(58) Field of Classification Search
CPC ... H01M 10/399; H01M 4/70; H01M 10/3954
(Continued)

(56) References Cited

U.S. PATENT DOCUMENTS

| 1,501,756 | A |  | 7/1924 | Downs |
| 3,117,032 | A | * | 1/1964 | Panzer ................... H01M 6/36 429/112 |

(Continued)

FOREIGN PATENT DOCUMENTS

| CN | 101707241 | 5/2010 |
| EP | GB2182194 | 5/1987 |

(Continued)

OTHER PUBLICATIONS

Goodenough, J.B. et al., "Fast Na+-Ion Transport in Skeleton Structures", *Mat. Res. Bull.*, vol. 11, Pergamon Press, Inc. Printed in the United States,(1976),203-220.

(Continued)

*Primary Examiner* — Helen Oi K Conley
(74) *Attorney, Agent, or Firm* — Foley & Lardner LLP; Joseph P. Meara (57) ABSTRACT

A rechargeable galvanic cell that has a negative electrode material made of a molten alkali metal (such as sodium or lithium). The galvanic cell also includes a positive electrode active material that may be sulfur or iodine. The positive electrode active material may be used in conjunction with a polar solvent. An ion-conductive separator is disposed between the polar solvent and the negative electrode material. The positive electrode active material has a specific gravity that is greater than the specific gravity of the polar solvent. Thus, the positive electrode active material is proximate the bottom of the positive electrode compartment while the polar solvent is above the positive electrode active material. The cell is designed to be operated at temperatures above the melting point of the alkali metal, but at temperatures that are lower than about 250° C.

19 Claims, 6 Drawing Sheets

(58) Field of Classification Search
USPC .................................. 429/105, 231.9, 218.1
See application file for complete search history.

(56) References Cited

U.S. PATENT DOCUMENTS

| | | | |
|---|---|---|---|
| 3,297,486 A * | 1/1967 | Weininger | H01G 9/21 |
| | | | 429/101 |
| 3,660,170 A | 5/1972 | Rampel | |
| 3,785,965 A | 1/1974 | Welty | |
| 3,787,315 A | 1/1974 | Bearden, Jr. et al. | |
| 3,788,978 A | 1/1974 | Bearden, Jr. et al. | |
| 3,791,966 A | 2/1974 | Bearden | |
| 3,849,200 A | 11/1974 | Charles et al. | |
| 3,929,506 A | 12/1975 | Gritzner et al. | |
| 3,970,472 A | 7/1976 | Steffensen | |
| 4,018,969 A | 4/1977 | Fischer et al. | |
| 4,041,215 A | 8/1977 | Kormanyos et al. | |
| 4,053,371 A | 10/1977 | Towsley et al. | |
| 4,076,613 A | 2/1978 | Bearden, Jr. | |
| 4,182,797 A | 1/1980 | Kondo et al. | |
| 4,207,391 A | 6/1980 | Church et al. | |
| 4,244,986 A | 1/1981 | Paruso et al. | |
| 4,298,666 A | 11/1981 | Taskier | |
| 4,307,164 A | 12/1981 | Church et al. | |
| 4,372,823 A | 2/1983 | Church et al. | |
| 4,430,393 A * | 2/1984 | Bennett | H01M 10/36 |
| | | | 429/101 |
| 4,465,744 A | 8/1984 | Susman et al. | |
| 4,479,856 A | 10/1984 | Ando | |
| 4,542,444 A | 9/1985 | Boland | |
| 4,546,055 A | 10/1985 | Coetzer et al. | |
| 4,623,597 A | 11/1986 | Sapru et al. | |
| 4,774,156 A | 9/1988 | Bones et al. | |
| 4,828,939 A | 5/1989 | Turley et al. | |
| 4,842,963 A | 6/1989 | Ross, Jr. et al. | |
| 4,937,155 A | 6/1990 | Tokoi et al. | |
| 5,057,206 A | 10/1991 | Engel et al. | |
| 5,213,908 A | 5/1993 | Hagedorn | |
| 5,290,405 A | 3/1994 | Joshi et al. | |
| 5,342,709 A | 8/1994 | Yahnke et al. | |
| 5,427,873 A | 6/1995 | Shuster | |
| 5,516,598 A | 5/1996 | Visco et al. | |
| 5,525,442 A | 6/1996 | Shuster | |
| 5,541,019 A | 7/1996 | Anani et al. | |
| 5,580,430 A | 12/1996 | Balagopal et al. | |
| 5,686,201 A | 11/1997 | Chu | |
| 5,695,632 A | 12/1997 | Brons et al. | |
| 5,780,186 A | 7/1998 | Casey, Jr. | |
| 5,856,047 A | 1/1999 | Venkatesan et al. | |
| 5,882,812 A | 3/1999 | Visco et al. | |
| 5,935,421 A | 8/1999 | Brons et al. | |
| 6,017,651 A | 1/2000 | Nimon et al. | |
| 6,025,094 A | 2/2000 | Visco et al. | |
| 6,030,720 A | 2/2000 | Chu et al. | |
| 6,033,343 A | 3/2000 | Licht | |
| 6,110,236 A | 8/2000 | Tsang et al. | |
| 6,153,328 A | 11/2000 | Colborn | |
| 6,159,634 A | 12/2000 | Yen et al. | |
| 6,165,644 A | 12/2000 | Nimon et al. | |
| 6,200,704 B1 | 3/2001 | Katz et al. | |
| 6,210,564 B1 | 4/2001 | Brons et al. | |
| 6,210,832 B1 | 4/2001 | Visco et al. | |
| 6,214,061 B1 | 4/2001 | Visco et al. | |
| 6,225,002 B1 | 5/2001 | Nimon et al. | |
| 6,248,476 B1 | 6/2001 | Sun et al. | |
| 6,248,481 B1 | 6/2001 | Visco et al. | |
| 6,265,100 B1 | 7/2001 | Saaski et al. | |
| 6,291,090 B1 | 9/2001 | Kuznetsov et al. | |
| 6,310,960 B1 | 10/2001 | Saaski et al. | |
| 6,355,379 B1 | 3/2002 | Ohshita et al. | |
| 6,358,643 B1 | 3/2002 | Katz et al. | |
| 6,368,486 B1 | 4/2002 | Thompson et al. | |
| 6,376,123 B1 | 4/2002 | Chu | |
| 6,402,795 B1 | 6/2002 | Chu et al. | |
| 6,413,284 B1 | 7/2002 | Chu et al. | |
| 6,413,285 B1 | 7/2002 | Chu et al. | |
| 6,416,903 B1 | 7/2002 | Fierro et al. | |
| 6,432,584 B1 | 8/2002 | Visco et al. | |
| 6,537,701 B1 | 3/2003 | Nimon et al. | |
| 6,610,440 B1 | 8/2003 | LaFollette et al. | |
| 6,632,573 B1 | 10/2003 | Nimon et al. | |
| 6,737,197 B2 | 5/2004 | Chu et al. | |
| 6,787,019 B2 | 9/2004 | Jacobson et al. | |
| 6,852,450 B2 | 2/2005 | Hwang et al. | |
| 6,881,234 B2 | 4/2005 | Towsley | |
| 6,911,280 B1 | 6/2005 | De Jonghe et al. | |
| 6,955,753 B1 | 10/2005 | Gomez | |
| 6,955,866 B2 | 10/2005 | Nimon et al. | |
| 6,991,662 B2 | 1/2006 | Visco et al. | |
| 7,070,632 B1 | 7/2006 | Visco et al. | |
| 7,144,654 B2 | 12/2006 | LaFollette et al. | |
| 7,166,384 B2 | 1/2007 | LaFollette et al. | |
| 7,214,443 B2 | 5/2007 | Clarke et al. | |
| 7,259,126 B2 | 8/2007 | Gordon et al. | |
| 7,282,295 B2 | 10/2007 | Visco et al. | |
| 7,282,296 B2 | 10/2007 | Visco et al. | |
| 7,282,302 B2 | 10/2007 | Visco et al. | |
| 7,390,591 B2 | 6/2008 | Visco et al. | |
| 7,432,017 B2 | 10/2008 | Visco et al. | |
| 7,482,096 B2 | 1/2009 | De Jonghe et al. | |
| 7,491,458 B2 | 2/2009 | Visco et al. | |
| 8,012,621 B2 | 9/2011 | Joshi et al. | |
| 8,088,270 B2 | 1/2012 | Gordon et al. | |
| 2002/0150818 A1 | 10/2002 | Amatucci et al. | |
| 2003/0108788 A1 | 6/2003 | Miyoshi et al. | |
| 2004/0197641 A1 | 10/2004 | Visco et al. | |
| 2004/0229107 A1 | 11/2004 | Smedley | |
| 2005/0109617 A1 | 5/2005 | Ono et al. | |
| 2005/0175894 A1 | 8/2005 | Visco et al. | |
| 2005/0175903 A1 | 8/2005 | Kim et al. | |
| 2006/0096893 A1 | 5/2006 | De Almeida et al. | |
| 2006/0141346 A1 | 6/2006 | Gordon et al. | |
| 2006/0177732 A1 | 8/2006 | Visco et al. | |
| 2006/0226022 A1 | 10/2006 | Balagopal et al. | |
| 2006/0257734 A1 | 11/2006 | Obata et al. | |
| 2007/0048610 A1 | 3/2007 | Tsang et al. | |
| 2007/0048617 A1 | 3/2007 | Inda | |
| 2007/0072067 A1 | 3/2007 | Symons et al. | |
| 2007/0154762 A1 | 7/2007 | Schucker | |
| 2007/0172739 A1 | 7/2007 | Visco et al. | |
| 2007/0221265 A1 | 9/2007 | Affinito et al. | |
| 2007/0259235 A1 | 11/2007 | Jacobson et al. | |
| 2008/0268327 A1 | 10/2008 | Gordon et al. | |
| 2009/0061288 A1 | 3/2009 | Gordon et al. | |
| 2009/0134040 A1* | 5/2009 | Gordon et al. | 205/560 |
| 2009/0134842 A1 | 5/2009 | Joshi et al. | |
| 2009/0136830 A1 | 5/2009 | Gordon | |
| 2009/0189567 A1 | 6/2009 | Joshi et al. | |
| 2010/0068629 A1 | 3/2010 | Gordon | |
| 2010/0239893 A1 | 9/2010 | Gordon et al. | |
| 2010/0285372 A1 | 11/2010 | Lee et al. | |
| 2011/0104526 A1 | 5/2011 | Boxley et al. | |
| 2012/0040274 A1 | 2/2012 | Gordon | |
| 2012/0126752 A1 | 5/2012 | Joshi et al. | |
| 2012/0141856 A1 | 6/2012 | Gordon et al. | |

FOREIGN PATENT DOCUMENTS

| | | |
|---|---|---|
| GB | 2 182 194 A | 5/1987 |
| JP | 59-75985 | 4/1984 |
| JP | 5975985 | 4/1984 |
| JP | 62-086672 A | 4/1987 |
| JP | 6286672 | 4/1987 |
| JP | 62186470 | 8/1987 |
| JP | 08321322 A | 12/1996 |
| JP | 2001-307709 | 11/2001 |
| JP | 2001307709 | 11/2001 |
| JP | 2002-245847 A | 8/2002 |
| JP | 200579096 | 3/2005 |
| KR | 2004047664 | 6/2004 |
| KR | 100651246 | 8/2005 |
| KR | 20070021110 | 2/2007 |
| KR | 20070021110 A | 2/2007 |
| KR | 2007028588 | 3/2007 |

(56) References Cited

FOREIGN PATENT DOCUMENTS

| WO | WO-2005/038953 | 4/2005 |
|---|---|---|
| WO | WO2005038953 | 4/2005 |
| WO | WO-2005/091946 | 10/2005 |

OTHER PUBLICATIONS

Hong, H.Y-P. et al., "Crystal Structures and Crystal Chemistry in the System Na1+xZr2SixP3-xO12", Mat. Res. Bull., vol. 11, 1976. Pergamon Press, Inc. Printed in the United States.,(1976),173-186.
Bentzen, J. J., et al., "The preparation and characterization of dense, highly conductive Na5GdSi4O12 nasicon (NGS)", Materials Research Bulletin, vol. 15,(1980),1737-1745.
Delmas, C. et al., "Crystal chemistry of the Na1+xZr2-xLx(PO4)3 (L=Cr, In, Yb) solid solutions", Materials Research Bulletin, vol. 16,(1981),285-290.
Von Alpen, V. et al., "Compositional dependence of the electrochemical and structural parameters in the NASICON system (Na1+xSixZr2P3-xO12)", Solid State Ionics, vol. 3/4,(1981),215-218.
Fujitsu, S. et al., "Conduction paths in sintered ionic conductive material Na1+xYxZr2-x(PO4)3", Materials Research Bulletin, vol. 16,(1981),1299-1309.
Saito, Y. et al., "Ionic Conductivity of NASICON-type conductors Na1.5M0.5Zr1.5(PO4)3 (M: Al3+, Ga3+, Cr3+, Sc3+, Fe3+, In3+, Yb3+, Y3+)", Solid State Ionics, vol. 58,(1992),327-331.
Alamo, J. "Chemistry and properties of solids with the [NZP] skeleton", Solid State Ionics, vol. 63-65,(1993),547-561.
Shimazu, K. et al., "Electrical conductivity and Ti4+ ion substitution range in NASICON system", Solid State Ionics, vol. 79, (1995),106-110.
Miyajima, Y. et al., "Ionic conductivity of NASICON-type Na1+xMxZr2-xP3O12(M: Yb, Er, Dy)", Solid State Ionics, vol. 84,(1996),61-64.
Manickam, Minakshi et al., "Lithium insertion into manganese dioxide electrode in MnO2/Zn aqueous battery Part I. A preliminary study", Journal of Power Sources, vol. 130, Issues 1-2 (Obtained through ScienceDirect),(May 2004),254-259.
Sumathipala, et al., "Novel Li+ Ion Conductors and Mixed Conductors, Li3+xSixCr1-xO4 and a Simple Method for Estimating Li+/e- Transport Numbers", J. Electrochem. Soc., vol. 142, No. 7,(Jul. 1995),2138-2143.
Kowalczk, et al., "Li-air batteries: A classic example of limitations owing to solubilities", Pure Appl. Chem., vol. 79, No. 5,(2007),851-860.
Read, "Characterization of the Lithium/Oxygen Organic Electrolyte Battery", J. Electrochem. Soc., vol. 149, No. 9,(2002),A1190-A1195.
Panero, et al., "High Voltage Lithium Polymer Cells Using a PAN-Based Composite Electrolyte", J. Electrochem. Soc., vol. 149, No. 4,(2002),A414-A417.
Dissanayake, et al., "Lithium ion conducting Li4-2xGe1-xSxO4 solid electrolytes", Solid State Ionics, 62,(1993),217-223.
Balagopal, et al., "Selective sodium removal from aqueous waste streams with NaSICON ceramics", Separation and Purification Technology, 15,(1999),231-237.
Sagane, et al., "Li+ and Na+ transfer through interfaces between inorganic solid electrolytes and polymer or liquid electrolytes", Journal of Power Sources, 146,(2005),749-752.
Wang, et al., "LiTi2(PO4)3 with NASICON-type structure as lithium-storage materials", Journal of Power Sources, 124,(2003),231-236.
Dissanayake, et al., "New solid electrolytes and mixed conductors: Li3+xCr1-xMxO4: M=Ge, Ti", Solid State Ionics, 76,(1995),215-220.
Kerr, "Polymeric Electrolytes: An Overview", Lithium Batteries: Science and Technology, Chapter 19, edited by Nazri and Pistoia, Kluwer Academic Publishers,(2004),574-622.
Young, Lee W., "International Search Report", PCT Search Report for App. No. PCT/US 07/21978, (dated Oct. 10, 2008),1-2.

Young, Lee W., "Written Opinion of the International Searching Authority", PCT Written Opinion for App. No. PCT/US 07/21978, (dated Oct. 10, 2008),1-5.
Young, Lee W., "International Search Report", PCT Search Report for App. No. PCT/US 08/10435, (dated Nov. 25, 2008),1-2.
Young, Lee W., "Written Opinion of the International Searching Authority", PCT Written Opinion for App. No. PCT/US 08/10435, (dated Nov. 25, 2008),1-4.
Fu, "Effects of M3+ Ions on the Conductivity of Glasses and Glass-ceramics in the system Li2O—M2O3—GeO2—P2O5 (M=Al, Ga, Y, Dt, Gd, and La)", Communications of the American Ceramic Society, vol. 83, No. 4, (Apr. 2000),104-106.
Thokchom, et al., "Superionic Conductivity in a Lithium Aluminum Germanium Phosphate Glass-Ceramic", Journal of the Electrochemical Society, 155 (12), (Oct. 8, 2008),A915-A920.
Fu, "Fast Li+ Ion Conducting Glass Ceramics in the System Li2O—Al2O3—TiO2—P2O5", Science Direct, Solid State Ionics, vol. 104, Issues 3-4, (Dec. 11, 1997),191-194.
Saienga, et al., "The Comparative Structure, Property, and Ionic Conductivity of LiI+Li2S+GeS2 Glasses Doped with Ga2S3 and La2S3", Journal of Non-Crystalline Solids, vol. 354, 14, (Mar. 1, 2008),Abstract.
Wang, et al., "Polymer Composite Electrolytes Containing Active Mesoporous SiO2 Particles", Journal of Applied Physics, 102, (2007),1-6.
Wang, et al., "Li1.3Al0.3Ti1.7(PO4)3 Filler Effect on (PEO)LiClO4 Solid Polymer Electrode", Department of Materials Science and Engineering, Zhejiang University, (2004),Abstract.
Kim, "International Search Report", International App. No. PCT/US2008/084707, (dated Apr. 29, 2009),1-3.
Kim, "Written Opinion of the International Searching Authority", International App. No. PCT/US2008/084707, (dated Apr. 29, 2009),1-4.
Park, Jin "Written Opinion of the International Searching Authority dated Jun. 30, 2009", Int. App. No. PCT/US2008/084572, (Jun. 30, 2009),1-3.
Park, Jin "International Search Report dated Jun. 30, 2009", Int. App. No. PCT/US2008/084572, (Jun. 30, 2009),1-3.
Kim, Jun Hak "Written Opinion of the International Searching Authority dated Aug. 24, 2009", Int. App. No. PCT/US2009/032458, (Aug. 24, 2009),1-4.
Kim, Jun Hak "International Search Report dated Aug. 24, 2009", Int. App. No. PCT/US2009/032458, (Aug. 24, 2009),1-3.
Armand, Michel et al., "ionic-liquid materials for the electrochemical challenges of the future", Nature Materials, (Jul. 24, 2009),621-629.
Doyle, Kevin P., et al., "Dentrite-Free Electrochemical Deposition of Li—Na Alloys from an Ionic Liquid Electrolyte", Journal of the Electrochemical Society, (May 2006),A1353-A1357.
Kim, K et al., "Electrochemical Investigation of Quaternary Ammonium/Aluminum Chloride Ionic Liquids", Journal of the Electrochemical Society, (Jun. 2004),A1168-A1172.
Kim, Ketack et al., "The Role of Additives in the Electroreduction of Sodium Ions in Chloroaluminate-Based Ionic Liquids", Journal of The Electrochemical Society, (Dec. 2004),E9-E13.
Lang, Christopher M., et al., "Cation Electrochemical Stability in Chloroaluminate Ionic Liquids", J. Phys. Chem., (2005),19454-19462.
Salminen, Justin et al., "Ionic liquids for rechargeable lithium batteries", Lawrence Berkeley National Laboratory, (Sep. 21),1-19.
Yoshimura, et al., "IPDL Machine Translation of JP-2001-307709", IPDL Machine Translation of JP-2001-307709, (Nov. 2, 2001),1-12.
Totsuka, Kazuhide "IPDL Machine Translation of JP08-321322A", IPDL Machine Translation of JP08-321322A, (Mar. 12, 1996),1-10.
Imanaka, Nobuhito "IPDL Machine Translation of JP 2002-245847 A", IPDL Machine Translation of JP 2002-245847 A, (Aug. 30, 2002),1-6.
Wu, Xian Ming et al., "Preparation and characterization of lithium-ion-conductive Li(1.3)Al(0.3)Ti(1.7)(PO4)3 thin films by the solution deposition", Thin Solid Films 425, (2003),103-107.
Parsons, Thomas H., "Office Action for U.S. Appl. No. 12/022,381", (dated May 24, 2011),1-11.

(56) References Cited

OTHER PUBLICATIONS

Cantelmo, Gregg "Office Action for U.S. Appl. No. 11/944,719", (dated Dec. 27, 2010),1-8.
Cullen, Sean P., "Office Action for U.S. Appl. No. 12/205,759", (dated Sep. 16, 2010),1-22.
Cullen, Sean P., "Office Action for U.S. Appl. No. 12/205,759", (dated Apr. 13, 2011),1-15.
Kalafut, Stephen J., "Office Action for U.S. Appl. No. 11/871,824", (dated Dec. 10, 2010),1-7.
Kalafut, Stephen J., "Office Action for U.S. Appl. No. 11/871,824", (dated May 25, 2010),1-8.
Apicella, Karie O., "Office Action for U.S. Appl. No. 12/323,165", (dated Jun. 1, 2011),1-10.
Lee, Kang Young "International Search Report", International App. No. PCT/US2010/055718, (dated Jun. 21, 2011),1-3.
Lee, Kang Young "Written Opinion", International App. No. PCT/US2010/055718, (dated Jun. 21, 2011),1-3.
Park, Jin "International Search Report", PCT App. No. US2008/084728 (Corresponding to U.S. Appl. No. 12/323,165), (dated Jun. 30, 2009),1-3.
Park, Jin "Written Opinion of the International Searching Authority", PCT App. No. US2008/084728 (Corresponding to U.S. Appl. No. 12/323,165), (dated Jun. 30, 2009),1-3.
Inda, Yasushi "Bibliography and Abstract (English Language)", Korean patent application publication KR20040047664, (Jun. 5, 2004),1.
Inda, Yasushi "Bibliography and Abstract (English Language)", Korean Patent Application Publication KR20070028588, (Mar. 12, 2007),1.
Apicella, Karie O., "Final Office Action", U.S. Appl. No. 12/323,165, (dated Sep. 8, 2011),1-11.
Cullen, Sean P., "Non-Final Office Action", U.S. Appl. No. 12/725,319, (dated Jan. 6, 2012),1-10.
Cullen, Sean P., "Final Office Action", U.S. Appl. No. 12/725,319, (dated Apr. 27, 2012),1-12.
Cho, Jun B., "International Search Report", PCT App. No. US2010/027535 (Corresponding to U.S. Appl. No. 12/725,319, (dated Oct. 20, 2010),1-4.
Cho, Jun B., "Written Opinion of the International Searching Authority", PCT App. No. US2010/027535 (Corresponding to U.S. Appl. No. 12/725,319), (dated Oct. 20, 2010),1-5.
Ryu, et al., "Bibliographical Data and Abstract (English Language)", Application Publication for US2007154814, Corresponding to KR10-0651246, (Aug. 22, 2005),1.
Wiedemann, Eric "Supplementary European Search Report", European Patent Application No. 10754004.9 (Corresponding to U.S. Appl. No. 12/725,319, (dated May 16, 2012),1-6.
Suzuki, et al., "Bibliographical Data and Abstract (English Language)", Japanese Patent application JP62-186470, (Aug. 14, 1987),1-2.
Kabe, T. et al., "Hydrodesulfurization and Hydrodenitrogenation", *Wiley-VCH* (1999), (1999),37, 110-112.
Task Force on Strat. Uncnv. Fuel, "America's Strategic Unconventional Fuels, vol. III Resource and Technology Profiles", *America's Strategic Unconventional Fuels*, vol. III Resource and Technology Profiles (completed Feb. 2007, Published Sep. 2007)., Full text available at http://www.unconventionalfuels.org/publications/reports/Volume_III_ResourceTechProfiles(Final).pdf,(Sep. 2007),III-25.
Sonoda, et al., "Bibliographical Data and Abstract (English Translation)", Japanese Patent Application JP-59-75985, (Apr. 28, 1984),1-2.
Cullen, Sean P., "Non Final Office Action", U.S. Appl. No. 12/205,759, (dated Apr. 5, 2013),1-17.
Yun, Cho K., "Internationial Search Report", PCT App. No. PCT/US2012/036959 (corresponding to U.S. Appl. No. 13/466,844), (dated Nov. 23, 2012),1-3.
Yun, Cho K., "Written Opinion of the International Searching Authority", PCT App. No. PCT/US2012/036959 (corresponding to U.S. Appl. No. 13/466,844), (dated Nov. 23, 2012),1-5.
Kanno, Masashi "Non-Final Rejection", Japanese Patent Application No. 2013-542120, (dated Sep. 1, 2015),1-8.
Kim, Yeon-Gyeong "PCT International Search Report", Int. App. No. PCT/US2009/056781, (dated Mar. 2, 2010),1-4.
Kim, Yeon-Gyeong "PCT Written Opinion", Int. App. No. PCT/US2009/056781, (dated Mar. 2, 2010),1-3.
Anthony, Julian "Non-Final Office Action", U.S. Appl. No. 12/558,363, (dated Jan. 5, 2012),1-8.
Jang, Sung W., "International Search Report", PCT/US2011/046143 (Corresponding to U.S. Appl. No. 13/195,431), (dated Feb. 27, 2012),1-3.
Jang, Sung W., "Written Opinion of the International Searching Authority", PCT/US2011/046143 (Corresponding to U.S. Appl. No. 13/195,431), (dated Feb. 27, 2012),1-3.
Yang, Kyung S., "International Search Report", PCT App. No. PCT/US2011/062534 (Corresponding to U.S. Appl. No. 13/307,123), (dated Jul. 24, 2012),1-3.
Yang, Kyung S., "Written Opinion of the International Searching Authority", PCT App. No. PCT/US2011/062534 (Corresponding to U.S. Appl. No. 13/307,123), (dated Jul. 24, 2012)1-3.
Abraham, et al., "A Low Temperature Na—S Battery Incorporating a Soluble S Cathode", *ElectroChimica Acta*, 1978, vol. 23, Pergamon Press Ltd., (Jun. 1, 1978),501-507.
Jarvi, Tommi "European Search Report", European Patent Application 11845080.8 (Corresponding to U.S. Appl. No. 13/307,123), (dated Mar. 17, 2015),1-11.
Anthony, Julian "Notice of Allowance", U.S. Appl. No. 12/558,363, (dated Aug. 16, 2012),1-8.
Douyette, Kenneth "Non Final Office Action", U.S. Appl. No. 13/195,431, (dated Jun. 11, 2013),1-28.
Douyette, Kenneth "Final Office Action", U.S. Appl. No. 12/195,431, (dated Oct. 24, 2013),1-19.
Douyette, Kenneth "Notice of Allowance", U.S. Appl. No. 13/195,431, (dated Mar. 13, 2014),1-21.
Chan, Heng M. , "Non Final Office Action", U.S. Appl. No. 14/539,435, dated Jan. 25, 2017, 1-9.
Chan, Heng M. , "Notice of Allowance", U.S. Appl. No. 14/539,435, dated May 8, 2017, 1-10.
Unknown, , "Decision to Grant", Japanese Patent Application No. 2013-542120, dated Oct. 25, 2016, 1-4.
Unknown, , "English Bibliographic Data for CN101707241", U.S. Appl. No. 14/539,435, May 12, 2010.
Kanno, Masashi "Non Final Office Action", Japanese Patent Application No. 2013-542120, (dated Sep. 1, 2015),1-3.
Kanno, Masashi "Non Final Office Action (English Translation)", Japanese Patent Application No. 2013-542120, (dated Sep. 1, 2015),1-5.
International Preliminary Report on Patentability in International Application No. PCT/US2011/062534 dated Jun. 4, 2013 (4 pages).
International Search Report and Written Opinion in International Application No. PCT/US2011/062534 dated Jul. 24, 2012 (6 pages).
Supplementary European Search Report in EP Application No. 11845080.8 dated Mar. 25, 2015 (4 pages).

\* cited by examiner

MODERATE TEMPERATURE SODIUM BATTERY

CROSS-REFERENCED RELATED APPLICATIONS

This application claims the benefit of U.S. Provisional Patent Application No. 61/418,749 filed Dec. 1, 2010, entitled "Moderate Temperature Sodium Battery." This prior application is expressly incorporated herein by reference.

BACKGROUND OF THE INVENTION

1. Field of the Invention

The present embodiments relate to batteries and more particularly to an apparatus and method for improving the performance of sodium-sulfur and sodium-iodide batteries.

2. Description of the Related Art

Our society has come to rely on batteries to power a myriad of devices, including computers, cell phones, portable music players, lighting devices, as well as many other electronic components. Nevertheless, there is an ongoing need for further advances in battery technology. For example, there is still a significant need for economical batteries that can power automobiles or provide load-leveling capabilities for wind, solar, or other energy technologies. (Such load-leveling capabilities may be used, for example, in power plants as a mechanism for storing the energy that is generated by the wind or solar generators.) Furthermore, the "information age" increasingly demands portable batteries that provide lighter weight, higher energy, longer discharge times, and smaller customized designs. To achieve these advances, technologists continue to work to develop batteries with higher and higher energy densities while still providing acceptable safety, power densities, cost, and other needed characteristics.

Sodium-sulfur (Na—S) batteries offer great potential to meet many of the above-stated needs. The theoretical specific energy of sodium-sulfur batteries is 792 Wh/kg, assuming the following overall reaction:

$2Na+3S \rightarrow Na_2S_3$

This is one of the highest known specific energies for batteries that use non-gaseous constituents. The materials needed to produce these batteries are light, energetic, inexpensive, and readily available. In contrast with other types of positive electrode materials, sulfur is relatively non-toxic, thereby making these batteries relatively safe for human contact.

In light of this high specific energy, sodium-sulfur batteries have been commercialized into batteries that operate at elevated temperatures, e.g., at temperatures in excess of 250° C. and more typically between 300° C. and 350° C. Such sodium-sulfur batteries generally use one or more beta alumina membranes or beta" alumina membranes. These membranes require high temperature for good conductivity. Also the sodium negative electrode and sulfur positive electrode are molten at the elevated temperatures (e.g., between 300° C. and 350° C.) associated with these Na—S batteries.

Obviously, researchers have attempted to create sodium-sulfur batteries that can operate at lower temperatures (e.g., less than 250° C.). For example, U.S. Patent Application Publication No. 2010/0239893 discloses a sodium-sulfur battery which utilizes a ceramic alkali ion-conductive ceramic membrane and a solid alkali metal negative electrode (such as sodium). The battery taught by this patent application is designed to operate below 200° C. (The disclosure of U.S. Patent Application Publication No. 2010/0239893 is expressly incorporated herein by reference.)

However, there is still a need in the art for a new type of sodium-sulfur battery (and sodium-iodine battery) that can operate at lower temperatures but still can provide high power, high current density and other desired characteristics. Such a battery is disclosed herein.

BRIEF SUMMARY OF THE INVENTION

The present embodiments provide a battery that can have a high operating cell potential and produce high power, but can operate at a lower temperature than other sodium-sulfur batteries. A battery according to the present embodiments is constructed of one or more galvanic cells. Each of these galvanic cells may have a negative electrode and a positive electrode. The positive electrode may be a non-gaseous material or may have an active material that is non-gaseous. In other words, at the temperatures in which the battery operates, usually between 100° C. and 250° C., the positive electrode (or positive electrode active material) may be in a non-gaseous state. In general, the positive electrode can be non-gaseous in the range where an alkali metal, such as sodium and lithium, is molten. In many embodiments, the positive electrode active material may be in a liquid state.

A polar solvent may be used in conjunction with the positive electrode active material. The positive electrode active material may have a specific gravity that is greater than the specific gravity of the polar solvent. The positive electrode active material may also, upon reaction of the battery, form an alkali metal salt or compound that is at least partially soluble in the polar solvent.

The polar solvent may be selected so that it remains in the liquid phase over the operating temperature of the battery, such as, for example, between 100° C. and 250° C. or between 185° C. and 250° C. If the operating temperatures of the battery have a narrower range, then the polar solvent should remain in the liquid phase throughout this narrower temperature range. Examples of polar solvents that may be used with the positive electrode active material are N-methyl formamide (NMF), formamide, dimethylformamide, tetraglyme, diglyme, dimethylether, acetamide, methylacetamide, dimethylacetamide and others. Most of these solvents have specific gravity in the range of 0.9 g/cubic centimeter to 1.1 g/cubic centimeter. Other polar solvents that may be used include ionic liquids such as Ethanolammonium nitrate, and imidazolium halogenoaluminate salts and/or other ionic liquids. Combinations of one or more of the foregoing solvents may also be used. The polar solvents may be non-aqueous solvents.

Suitable positive electrode active materials for the batteries of the present embodiments are sulfur and iodine. Sulfur has a specific gravity of 2.07 g/cubic centimeter and is molten in the range of 115° C. to 445° C. Sulfur also forms a couple with sodium. When sulfur is used as a positive electrode in a battery and sodium is used as the negative electrode, the battery may produce approximately 2.2V of output. Similarly, iodine has a specific gravity of 4.92 g/cubic centimeter and is liquid in the range 114° C. to 185° C. Iodine also forms a complex with sodium ions. When iodine is used as a positive electrode in a battery and sodium is used as the negative electrode, the battery may be capable of producing an output of approximately 3.2V. Further, the sodium salts of both sulfur and iodine are polar in nature and are soluble in many polar solvents, including the solvents listed above. In fact, polysulfides of sodium are particularly soluble in NMF.

When sulfur/iodine is used as the positive electrode (and sodium is used as the negative electrode), the following reactions will occur at the positive electrode:
Battery Discharge:

$$Na^+ + \tfrac{1}{2}I_2 + e^- \rightarrow NaI$$

$$2Na^+ + \tfrac{1}{8}S_8 + 2e^- \rightarrow Na_2S, \text{ alternatively}$$

$$2Na^+ + \tfrac{3}{8}S_8 + 2e^- \rightarrow Na_2S_3$$

(In the case of sulfur, polysulfides of various orders will also be formed at the positive electrode.)
Battery Charge:

$$NaI \rightarrow Na^+ + \tfrac{1}{2}I_2 + e^-$$

$$Na_2S \rightarrow 2Na^+ + \tfrac{1}{8}S_8 + 2e^-, \text{ alternatively}$$

$$Na_2S_3 \rightarrow 2Na^+ + \tfrac{3}{8}S_8 + 2e^-,$$

(In the case of sulfur, polysulfides of various orders will also be reduced at the positive electrode.)

As part of the battery, an alkali metal ion-conductive membrane separates the negative electrode materials from the positive electrode materials. Examples of the materials that may be used for this membrane are sodium beta alumina, sodium beta" alumina, and NaSICON (if the negative electrode material is sodium). A commercially available NaSICON membrane (that is available from Ceramatec, Inc., of Salt Lake City, Utah) is based on a sodium-metal-phosphate structure $(Na_{1+x}Zr_2X_y(PO_4)_3)$ wherein x is between 0 and 3 and X is a dopant. The conductivity of this NaSICON membrane is near 4.6 milli-Siemens/centimeter (mS/cm) at 100° C. and rises to about 17.5 mS/cm at 200° C. Other types of NaSICON membranes may also be used. If the negative electrode material is lithium, then lithium conductive membranes may be utilized such as LISICON or glass ceramic materials. LiSICON is a class of lithium conductive ceramics which include: $Li_{2+2x}Zn_{1-x}GeO_4$ (−0.36<x<0.87), $Li_{14}ZnGe_4O_{16}$, and slight variations in stoichiometry and with amounts of cation substitution. It should be noted that the term "LiSICON," as used herein, also includes the lithium aluminum titanium phosphate family of compositions including, but not limited to, ceramic membranes having the formula $Li_{1+x}Al_xTi_{2-x}(PO_4)_3$, where x is between 0.0 and 0.5; and $Li(1+x+4y)Al_xTi(1-x-y)(PO4)_3$ where x and y are between 0.0 and 0.5 and where slight substitutions of cations may be made to improve properties. The lithium-ion-conductive glass ceramic materials may include (but are not limited to) compositions in the lithiumaluminosilicate glass ceramics family as well as $Li_{1.5}Al_{0.5}Ge_{1.5}(PO_4)_3\text{-}xLi_2O$ (x=0.0-0.20). It is understood that partial substitutions of one or more of the elements with another element may improve a material characteristic but these variations/substitutions are part of the present embodiments.

The positive electrode compartment may house a positive electrode current collector. Since the specific gravity of the positive electrode active material is greater than the polar solvent, the liquid positive electrode active material resides on the bottom of the positive electrode compartment while the polar solvent resides above the active material. Depending on the state of charge or discharge of the cell, the level of positive electrode active material in the bottom of the cell will rise and fall. Accordingly, in order to compensate for the elevation changes of the liquid positive electrode active material, the positive electrode current collector may be constructed to ensure electrical contact with the active material/solvent interface, no matter what elevation changes may occur. In other words, the positive electrode current collector may be constructed so that it provides electrical contact with the liquid positive electrode active and the polar solvent at the interface of the polar solvent/positive electrode active material, regardless of where the interface may be located.

During the positive electrode reaction, the sodium ions that carry a positive charge migrate toward the positive electrode current collector. Such movement causes the sodium ions to pass through the polar solvent, electrons, and the positive electrode active material. As noted above, the location where the reaction occurs may change as the level of the liquid active material changes (e.g., the level/elevation of the liquid sulfur or iodine). The positive electrode current collector must be electronically conductive and may be non-reactive with the positive electrode active material, the solvent and the alkali salt. If the positive electrode active material is sulfur or iodine, sodium iodide may also be included in the positive electrode compartment to increase ionic conductivity of the mixture.

If lithium is utilized as the active negative electrode material, sulfur should be chosen as the positive electrode active material. The reason for this is that lithium melts at 181° C., which is near the boiling temperature for iodine. Thus in the case of lithium and sulfur, suitable operating temperature range may include 182° C. to 250° C. Of course, during this reaction, there must be a polar solvent that remains in its liquid state between the temperature range of 182° C. and 250° C.

BRIEF DESCRIPTION OF THE SEVERAL VIEWS OF THE DRAWINGS

In order that the manner in which the above-recited and other features and advantages of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the present embodiments, as represented in the Figures, is not intended to limit the scope of the invention, as claimed, but is merely representative of presently preferred embodiments of the invention.

Figure 1:
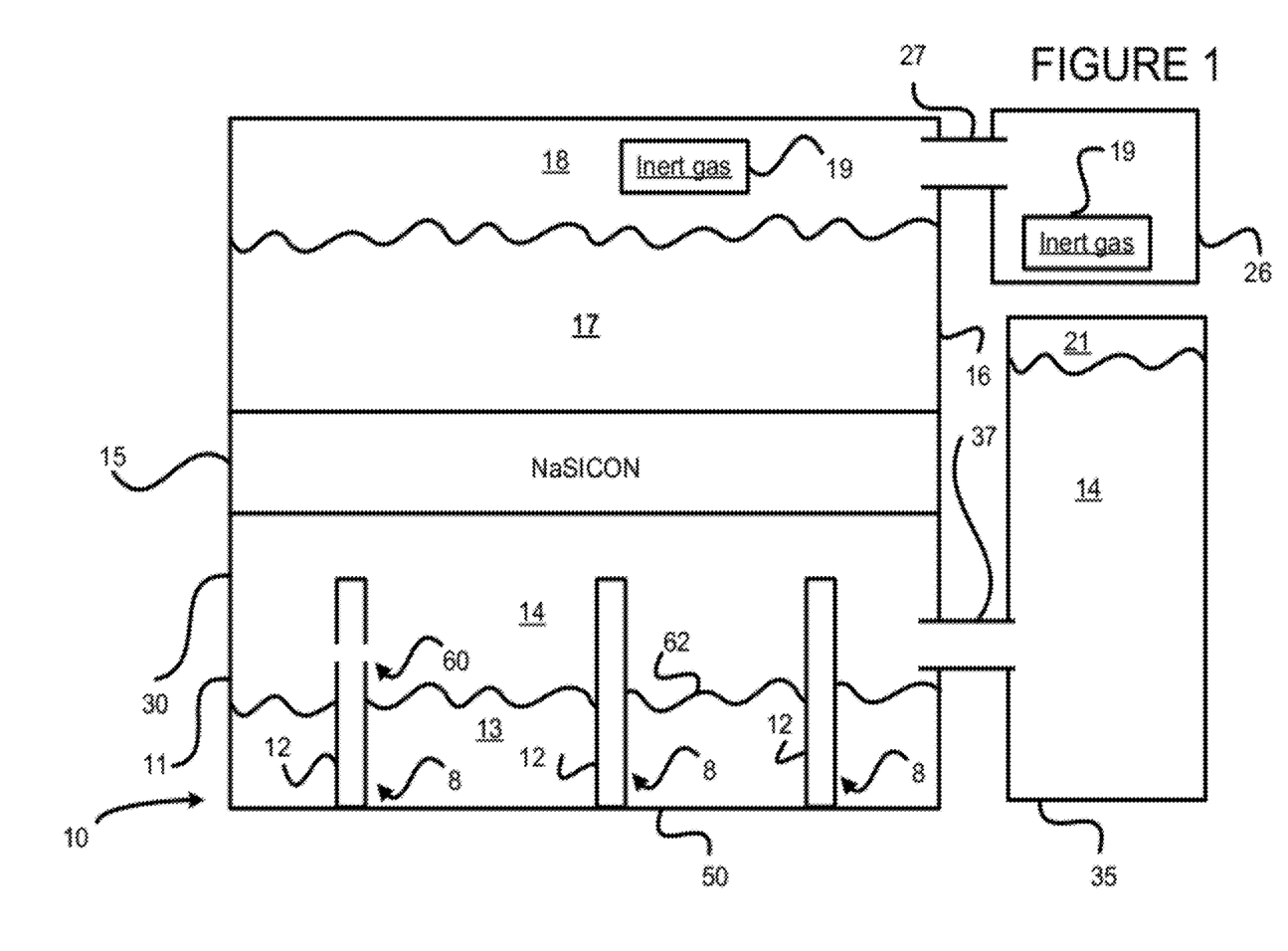
FIG. 1 is a schematic view of a galvanic cell according to the present embodiments.

Referring now to FIG. 1, a schematic representation of a galvanic cell 10 is illustrated. In FIG. 1, the cell 10 includes a positive electrode compartment 11 and a negative electrode compartment 16. Those skilled in the art will appreciate how to construct a cell 10 having a positive electrode compartment 11 and a negative electrode compartment 16. As known in the industry, an enclosure wall 30 may be used to form the positive electrode compartment 11 and the negative electrode compartment 16. The construction of the enclosure wall 30 should be such that there is not direct electrical communication between the negative electrode compartment 16 and the positive electrode compartment 11. This enclosure wall 30 may be impervious in order to prevent water, air, etc., from entering the cell 10 and reacting with the chemicals contained therein.

Within the negative electrode compartment 16 may be a negative electrode material 17. This negative electrode material 17 may be a metal. (Thus, as used herein, the negative electrode material 17 may be referred to herein as negative electrode metal 17.) As noted herein, the negative electrode metal may be an alkali metal, such as sodium or lithium. In general, the cell 10 will be operated at temperatures in which the negative electrode metal 17 (e.g., sodium or lithium) is liquid. Thus, in the depiction of FIG. 1, the negative electrode metal 17 is shown in a liquid state. For example, if the negative electrode metal 17 is lithium, the cell 10 may be designed such that it is operated (and/or maintained) at temperatures between about 185° C. and about 250° C. If the negative electrode metal 17 is sodium, the cell 10 may be designed such that it is operated (and/or maintained) at temperatures between about 100° C. and about 200° C., or more preferably, between about 100° C. and about 185° C., and even more preferably, between about 110° C. and about 170° C. In some embodiments, the negative electrode compartment is enclosed by a metal such as steel or stainless steel. Other materials may also be used.

Typically a headspace 18 may be within the negative electrode compartment 16 and may be positioned above the liquid negative electrode metal 17. The headspace 18 may further comprise an inert gas 19, such as nitrogen or argon. As the cell 10 is being charged or discharged, the negative electrode metal 17 (sodium or lithium) is either consumed or released in the reaction. Accordingly, because the amount of the negative electrode metal 17 changes, the level of the liquid negative electrode metal 17 may change (e.g., rise or fall). As the level of the liquid negative electrode metal 17 changes, the inert gas 19 may vent into and out of an overflow compartment 26 via conduit 27. Thus, the inert gas 19 in the headspace 18 is allowed to leave the galvanic cell 10 and re-enter the galvanic cell 10 as the cell 10 is charged or discharged. If desired, a valve or other regulating mechanism may be used to as part of the conduit 27 to allow the inert gas 19 to vent into and out of the compartment 26.

An ion-conductive membrane 15 is used in the cell 10. The ion-conductive membrane 15 separates the positive electrode compartment 11 from the negative electrode compartment 16 and thus isolates the negative electrode metal 17 from the chemicals housed within the positive electrode compartment 11. The ion-conductive membrane may be constructed such that there is no through porosity between the negative electrode compartment 16 and the positive electrode compartment 11. The membrane 15 may be capable of transporting alkali metal ions, such as sodium cations or lithium cations, through the membrane 15. In some embodiments, the membrane 15 may include porous layers positioned on the exterior surface of the membrane to increase the effective surface area of the membrane 15. In the embodiment of FIG. 1, the ion-conductive membrane 15 is a NaSICON membrane. However, as noted above, other materials that may be used for the ion-conductive membrane 15 include LiSICON, sodium beta alumina, and/or other materials. In the embodiment of FIG. 1, the ion-conductive membrane 15 is planar.

The positive electrode compartment 11 of the cell 10 may be formed with an enclosure wall 30. In some embodiments, the enclosure wall 30 may be separated into multiple layers which are electronically conductive and/or impervious. Each of the layers of the wall may serve its own function, such as the function of transmitting electrons and/or containing the constituents within the wall. Alternatively, the wall 30 may be a single layer that is designed to transmit electrons and contain the constituents within the wall 30. For example, the wall 30 may be comprised primarily of graphite or a corrosion resistant metal which is then wrapped (on the outside) with an impervious insulative polymer.

The positive electrode compartment 11 houses a polar solvent 14. The polar solvent 14 is selected so that it remains in the liquid phase over the operating temperature of the battery, (such as, for example, between 100° C. and 200° C.). Examples of polar solvents that may be used with the positive electrode active material are N-methyl formamide (NMF), formamide, dimethylformamide, tetraglyme, diglyme, dimethylether, and others. Most of these solvents have specific gravity in the range of 0.9 g/cubic centimeter to 1.1 g/cubic centimeter. Other polar solvents may include ionic liquids such as Ethanolammonium nitrate, and imidazolium halogenoaluminate salts and others. Other embodiments may use acetamide, methylacetamide, or dimethylacetamide as the solvent.

The positive electrode compartment 11 also houses a positive electrode active material 13. This positive electrode active material 13 may be sulfur or iodine. Sulfur has a specific gravity of 2.07 g/cubic centimeter and is molten in the range of 115° C. to 445° C. Similarly, iodine has a specific gravity of 4.92 g/cubic centimeter and is liquid in the range of 114° C. to 185° C. The sodium salts of both sulfur and iodine are polar in nature and are soluble in polar solvents such as those listed above. In fact, polysulfides of sodium are particularly soluble in NMF.

Because both sulfur and iodine have a specific gravity that is greater than the polar solvent 14, the positive electrode active material 13 (e.g., the sulfur/iodine) is positioned below the polar solvent 14 (e.g., at or near the bottom of the positive electrode compartment 11.) As the cell 10 is being charged or discharged, the positive electrode active material 13 (sulfur or iodine) is either consumed or released in the reaction. Accordingly, because the amount of the positive electrode active material 13 changes, the level of the polar solvent 14 in the positive electrode compartment 11 may also change (e.g., rise or fall). As the level of the positive electrode active material 13 changes, the polar solvent 14 may vent into and out of an overflow compartment 35 via conduit 37. Thus, the polar solvent 14 is allowed to leave the cell 10 and re-enter the cell 10 as the galvanic cell 10 charges or discharges. If desired, a valve or other regulating mechanism may be used to as part of the conduit 37 to allow the polar solvent 14 to vent into and out of the compartment 35.

In the embodiment of FIG. 1, the polar solvent 14 fills the positive electrode compartment 11 not filled by the positive electrode active material 13 such that the polar solvent 14 provides ionic communication between the ion-conductive membrane 15 and the positive electrode active material 13. There may be a headspace 21 above the polar solvent 14 in the overflow compartment 35. Other embodiments may be designed in which the polar solvent 14 entirely fills the overflow compartment 35 which may be designed to have variable volume through a movable or flexible wall or portion of a wall. In yet further embodiments, an inert gas (such as argon, nitrogen, etc.) is used in the headspace 21.

As shown in FIG. 1, embodiments may be constructed in which the positive electrode compartment 11 houses at least one positive electrode current collector 8. In the embodiment of FIG. 1, the current collector 8 comprises one or more current collector fins 12. (Of course, other embodiments may be designed in which the current collector comprises other structures.) These current collector fins 12 may extend into the positive electrode compartment 11 upwards from a base 50 of the positive electrode compartment 11. The fins 12 may be rods or other similar structures. The current collector fins 12 may serve to provide electrical contact to the interface 62 between the denser positive electrode active material 13 at the bottom of the positive electrode compartment 11 and the liquid polar solvent 14 positioned at the top of the positive electrode compartment 11. The fins 12 may be porous or have one or more holes to promote transport of material between fins 12. In FIG. 1, only one of the fins 12 is shown with a hole 60. However, all of the fins 12 may include holes 60 as desired. More than one hole 60 may also be used on the fin(s) 12, as desired. Also the fins 12 may be configured such that as the interface 62 between the polar solvent 14/positive electrode active material 13 rises and falls, the fins 12 still provide electronic contact to the interface 62. In other words, the fins 12 provide electrical contact to the interface 62 even when the interface 62 changes location (elevation). The fins 12 also provide a greater surface area for the reaction to occur, and thus provide an additional advantage. The height of one or more of the fins 12 is designed such that, even when the cell 10 is fully charged or discharged, the height of the interface 62 does not exceed the height of the at least one of the fins 12.

The reactions associated with the cell 10 will now be described. In the following example, sodium is used as the negative electrode metal 17:
Battery Discharge:
  Positive Electrode Reactions:

$\frac{1}{2}I_2 + e^- \rightarrow I^-$ (if iodine is used as the positive electrode active material 13)

$\frac{1}{8}S_8 + 2e^- \rightarrow S^{-2}$ or alternatively $S_y + 2e^- \rightarrow S_y^{-2}$, where $1 \leq y \leq 30$ or alternatively $\frac{1}{8}S_8 + S_y^{-2} + 2e^- \rightarrow S_{(y+1)}^{-2}$, where $1 \leq y \leq 30$ (if sulfur is used as the positive electrode active material 13; however, some polysulfides will also be formed at the positive electrodepositive electrode.)
  Negative Electrode Reactions:

$Na \rightarrow Na^+ + e^-$

Battery Charge:
  Positive Electrode Reactions:

$I^- \rightarrow \frac{1}{2}I_2 + e^-$ (if iodine is used as the positive electrode active material 13)

$S^{-2} \rightarrow \frac{1}{8}S_8 + 2e^-$, alternatively $S_y^{-2} \rightarrow S_y + 2e^-$, where $1 \leq y \leq 30$ or alternatively $S_{(y+1)}^{-2} \rightarrow \frac{1}{8}S_8 + S_y^{-2} + 2e^-$, where $1 \leq y \leq 30$ (if sulfur is used as the positive electrode active material 13)
  Negative Electrode Reactions:

$Na^+ + e^- \rightarrow Na$

When sulfur is used as a positive electrode in a battery and sodium is used as the negative electrode, the battery may produce approximately 2.2V of output. When iodine is used as a positive e electrode in a battery and sodium is used as the negative electrode, the battery may be capable of producing an output of approximately 3.2V.

Further, the embodiments may also be designed in which lithium is utilized as the negative electrode metal 17. In this case however, sulfur can be chosen as the positive electrode active material 13. The reason for this is that lithium melts at 181° C., which is near the boiling temperature for iodine. Thus in the case of lithium and sulfur, a suitable operating temperature range may be between 182° C. to 250° C. Of course, during this reaction, there must be a polar solvent that remains in its liquid state in this temperature range. When this embodiment is used, a LiSICON or other materials could be used as the membrane 15. In this embodiment, the following reactions would occur:
Battery Discharge:
  Positive Electrode Reactions:

$2Na^+ + \frac{1}{8}S_8 + e^- \rightarrow Na_2S$ (if sulfur is used as the positive electrode active material 13; however, some polysulfides will also be formed at the positive electrode.)
  Negative Electrode Reactions:

$Na \rightarrow Na^+ + e^-$

Battery Charge:
  Positive Electrode Reactions:

$Na_2S \rightarrow 2Na^+ + \frac{1}{8}S_8 + 2e^-$

Negative Electrode Reactions:

$Na^+ + e^- \rightarrow Na$

In the embodiment of FIG. 1, there are compartments 26 and 35 that are designed to receive the solvent or inert gas as the volume of the various compartments changes during charge/discharge. These additional compartments may be chambers, bags, or other similar structures, capable of housing liquid or gaseous materials. In some embodiments, the positive electrode compartment 11 and/or the negative electrode compartment 16 may be made of a flexible material such that the volume of these compartments may themselves change during the charging/discharging of the cell. In such embodiments that have the compartments 11, 16 made of a flexible material, the use of additional compartments 26 and 35 may not be necessary. In further embodiments, the compartments 26 and 35 may involve the use of a piston or bladder that may expand and contract to change the volume. Similarly, the compartments 11, 16 themselves may comprise a piston or bladder as a mechanism for changing the volume, as desired.

Figure 2:
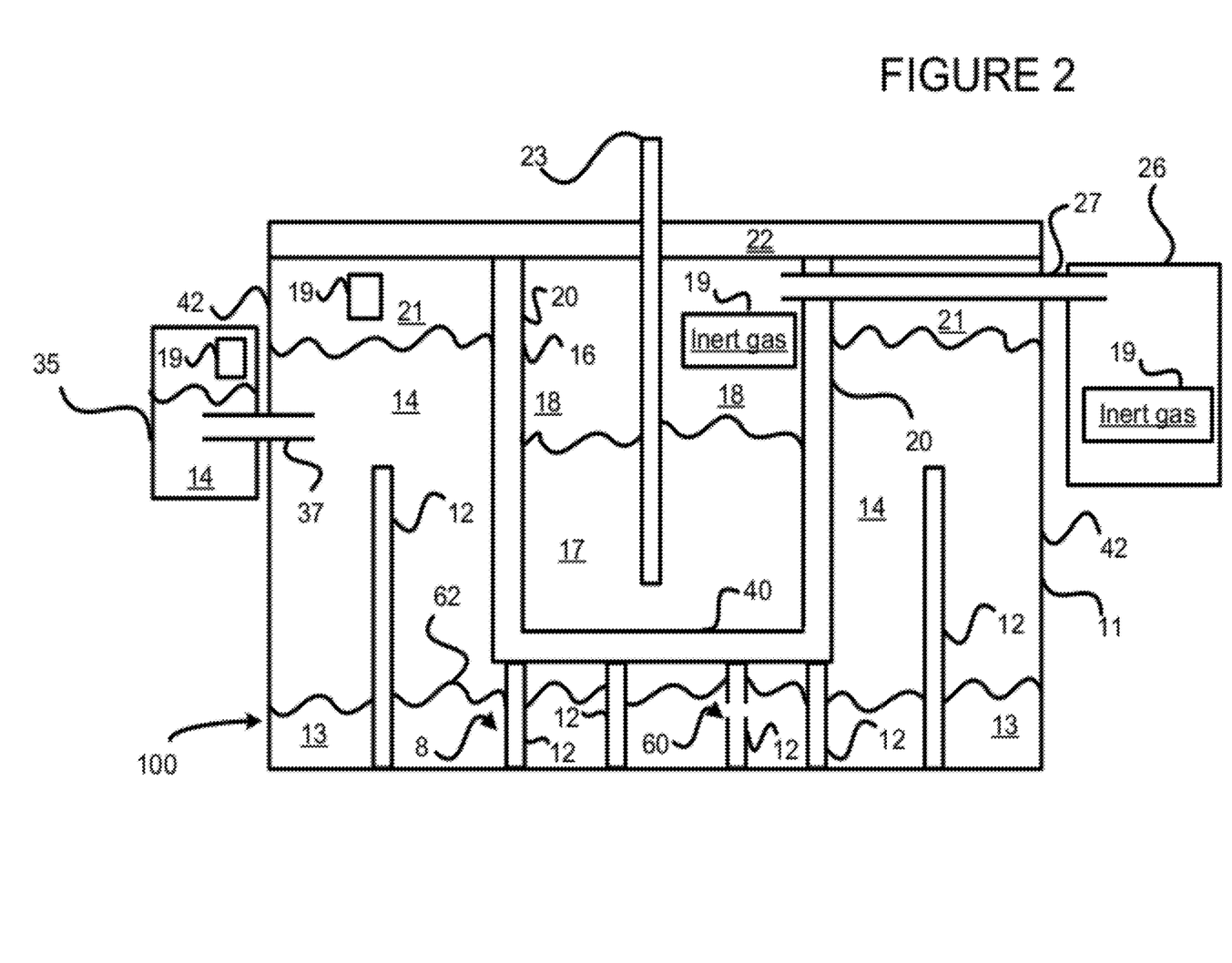
FIG. 2 is a schematic view of another galvanic cell according to the present embodiments.

Referring now to FIG. 2, another embodiment of a galvanic cell 100 is illustrated. It should be noted that the cell 100 is similar to the cell 10 shown in FIG. 1. Accordingly, many of the elements/components of the cell 100 are similar to the elements/components of the cell 10. For purposes of brevity, much of the discussion of these similar elements/components is omitted. It should be noted however, that in the embodiment of FIG. 2, the membrane separating the positive electrode compartment 11 from the negative electrode compartment 16 is tubular with a closed bottom.

In the cell 100, a positive electrode compartment 11 is illustrated. The positive electrode compartment 11 comprises an enclosure that houses a positive electrode active material 13. This positive electrode active material 13 may be sulfur or iodine. Positive electrode active material 13 may reside at the bottom of the positive electrode enclosure when the cell 100 is in the charged state. Polar solvent 14 is positioned above the positive electrode active material 13 (because the positive electrode active material 13 has a higher specific gravity than the solvent 14).

The positive electrode compartment 11 may comprise a positive electrode current collector 8. As with the prior embodiment, the current collector 8 may comprise one or more current collector fins 12. Such fins 12 may be positioned at or near the bottom of the positive electrode compartment 11. The current collector fins 12 may serve to provide electrical contact to the interface 62 between the denser positive electrode active material 13 at the bottom of the positive electrode compartment 11 and the liquid polar solvent 14 positioned at the top of the positive electrode compartment 11. The fins 12 may be porous or have one or more holes to promote transport of material between fins. Also the fins 12 may be configured such that as the interface 62 between the polar solvent 14/positive electrode active material 13 rises and falls, the fins 12 still provide electronic contact to the interface 62. As the cell 100 is being charged or discharged, the positive electrode active material 13 (sulfur or iodine) is either consumed or released in the reaction. Accordingly, because the amount of the positive electrode active material 13 changes, the level of the polar solvent 14 in the positive electrode compartment 11 may also change (e.g., rise or fall). As the level of the positive electrode active material 13 changes, the polar solvent 14 may vent into and out of an overflow compartment 35 via conduit 37. If desired, a valve or other regulating mechanism may be used as part of the conduit 37 to allow the polar solvent 14 to vent into and out of the compartment 35. Further, above the polar solvent 14 in the positive electrode compartment 11 may be a headspace 21. In some embodiments, the headspace 21 may be filled with an inert gas such as nitrogen or argon. This inert gas may be vented into and out of the compartment 35 to accommodate volume changes which will occur in each of the compartments as the cell is charged and discharged. Thus, the inert gas in the headspace 21 may be configured to leave the cell 100 and re-enter the cell 100 as the cell 100 charges or discharges. Alternatively, the inert gas in the headspace 21 may be vented into and out of a separate chamber/reservoir when the cell 100 charges/discharges.

The cell 100 further comprises negative electrode compartment 16 that houses a negative electrode metal 17. As noted above, the negative electrode metal 17 may be an alkali metal such as sodium or lithium. The cell 100 may be operated at temperatures where the negative electrode metal 17 is liquid. Accordingly, the level (vertical height) of the negative electrode metal 17 may rise and fall depending on the state of charge of the cell 100 (e.g., whether the cell 100 is fully charged, fully discharged, partially charged, etc.)

Typically a headspace 18 may be within the negative electrode compartment 16 and may be positioned above the liquid negative electrode metal 17. The headspace 18 may further comprise an inert gas 19, such as nitrogen or argon. As the cell 10 is being charged or discharged, the negative electrode metal 17 (sodium or lithium) is either consumed or released in the reaction. Accordingly, because the amount of the negative electrode metal 17 changes, the level of the liquid negative electrode metal 17 may change (e.g., rise or fall). As the level of the liquid negative electrode metal 17 changes, the inert gas 19 may vent into and out of an overflow compartment 26 (reservoir) via conduit 27. If desired, a valve or other regulating mechanism may be used as part of the conduit 27 to allow the inert gas 19 to vent into and out of the compartment 26.

A negative electrode current collector 23 provides electrical contact to the negative electrode metal and is designed to provide contact to the full extent of cell discharge. A cap 22 seals off the cell 100 to the environment.

In the embodiment of FIG. 2, the negative electrode metal 17 is contained within an ion-conductive membrane tube 20. The ion-conductive membrane tube 20 separates the positive electrode compartment 11 from the negative electrode compartment 16 and thus isolates the negative electrode metal 17 from the chemicals housed within the positive electrode compartment 11. The ion-conductive membrane may be constructed such that there is no through porosity between the negative electrode compartment 16 and the positive electrode compartment 11. The membrane tube 20 may be capable of transporting alkali metal ions, such as sodium cations or lithium cations, through the membrane. In some embodiments, the membrane tube 20 may include porous layers positioned on the exterior surface of the membrane to increase the effective surface area of the membrane 20. As shown in FIG. 2, the membrane is tubular with a closed bottom. The positive electrode compartment 11 may have one or more walls 42 that may extend above the lower level 40 (e.g., bottom) of the ion-conductive membrane tube 20.

The cell 100 may operate (e.g., be charged and discharged) in the manner noted above. It should be noted that the cells 10, 100 may be contained within a temperature controlled environment to ensure that they are operated at the proper temperature. In some embodiments, this temperature may be between 100° C. and 200° C. if the alkali metal used as the negative electrode is sodium. If lithium is utilized as the active negative electrode material, the cells 10, 100 may be operated at a temperature between 182° C. and 250° C. Thus, the present embodiments provide a Na—S battery or Na—I (or Li—S or Li—I) battery that can operate at a moderate temperature (e.g., less than about 250° C.).

The embodiment of FIG. 2 also includes one or more fins 12. As with the embodiment of FIG. 1, the height of one or more of the fins 12 is designed such that, even when the cell 10 is fully charged or discharged, the height of the interface 62 does not exceed the height of the at least one of the fins 12. Further, one or more of the fins 12 may comprise one or more holes 60, as desired. Again, although only one of the fins 12 in FIG. 2 is shown with a hole 60, those skilled in the art will appreciate that (1) additional holes may be added to the fins 12 and (2) that the other fins 12 may also comprise one or more holes 60.

In the embodiments of FIGS. 1-2, the positive electrode compartment 11 includes two different materials, a polar solvent 14 and an active material 13. Those skilled in the art will recognize that additional embodiments may be constructed in which the active material 13 is suspended in a gel or emulsion. (In this case, the gel/emulsion constitutes the solvent.) For example, the solvent 14 may be a matrix of PBDF or PVMF (which are inert materials). In such embodiments, the volume of positive electrode compartment's contents will stay the same within the matrix. An electrical conductor (such as carbon or carbon foam material) may be added to increase the conductivity of the positive electrode. For example, an electrode may be soaked in carbon foam to increase the conductivity or the voltage.

Further embodiments may also be designed in which the positive electrode compartment 11 includes porous carbon to allow the solvent to flow, thereby increasing the conductivity of the positive electrode compartment.

Figure 3:
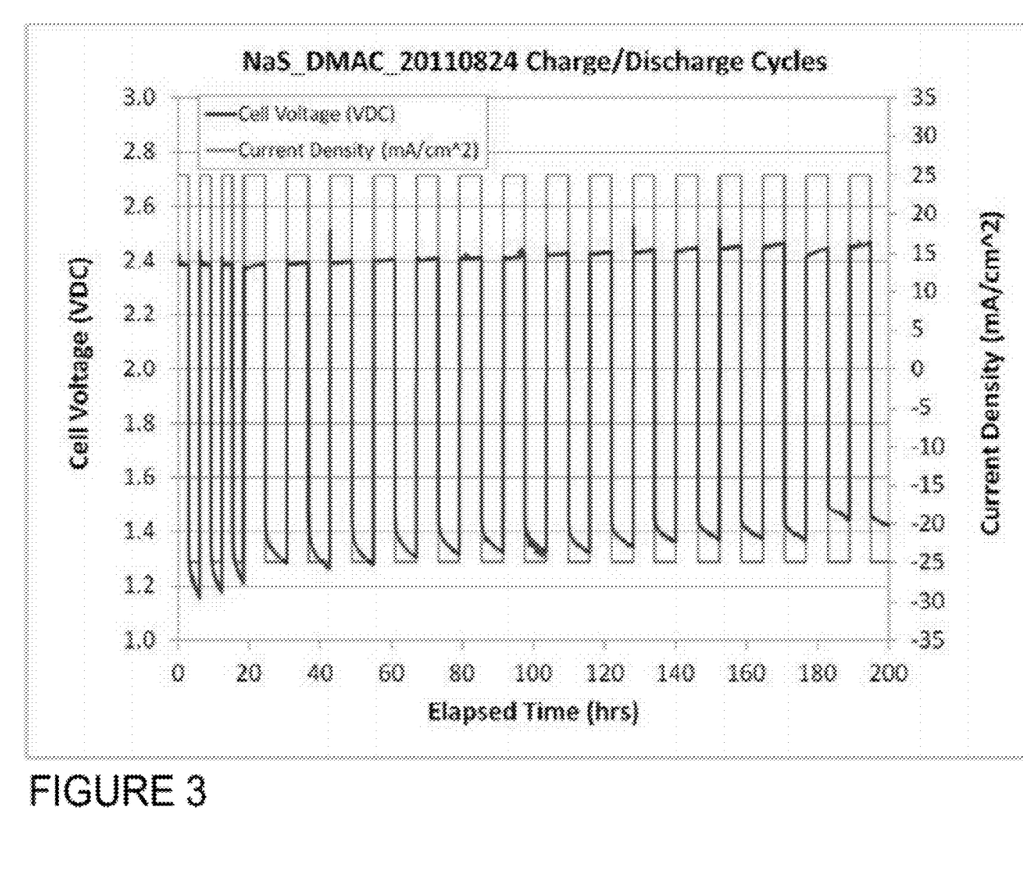
FIG. 3 is a graph showing the charge and discharge performance of a cell at 25 mA/cm² using molten sodium as the negative electrode, a NaSICON ceramic membrane, dimethylacetamide as the solvent in the positive electrode compartment and sulfur/sulfide as the positive electrode active material.
Figure 4:
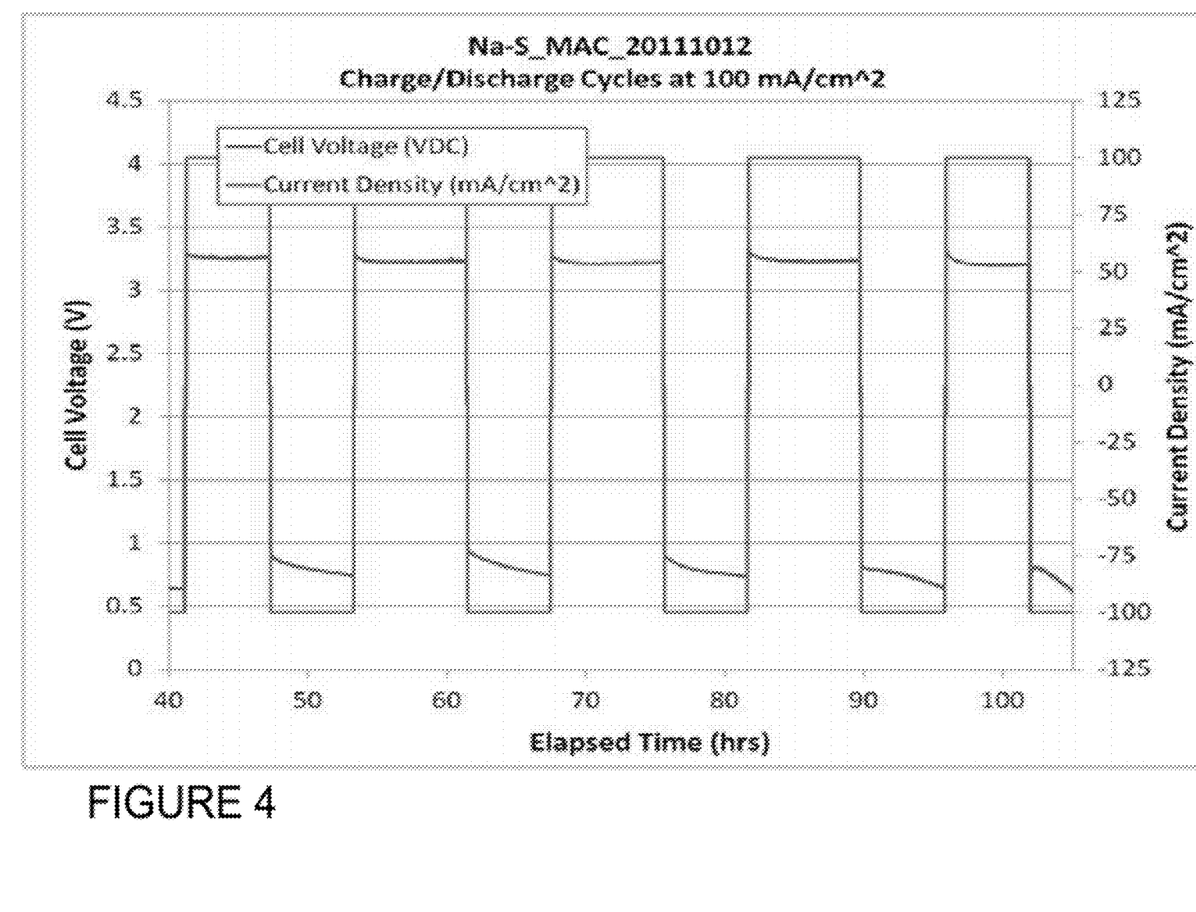
FIG. 4 is a graph showing the charge and discharge performance of a cell at 100 mA/cm² using molten sodium as the negative electrode, a NaSICON ceramic membrane, methylacetamide as the solvent in the positive electrode compartment and sulfur/sulfide as the positive electrode active material.

Examples of the performance of specific embodiments of a cell that may be constructed according to the present embodiments will now be given. For example, FIGS. 3 and 4 show test results that were obtained when other embodiments were constructed. Specifically, FIG. 3 shows the charge and discharge performance of a cell at 25 mA/c$^{m2}$ using molten sodium as the negative electrode, a NaSICON ceramic membrane, dimethylacetamide as the positive electrode solvent and sulfur/sulfide as the positive electrode active material.

FIG. 4 shows the charge and discharge performance of a cell at 100 mA/cm$^2$ using molten sodium as the negative electrode, a NaSICON ceramic membrane, methylacetamide as the positive electrode solvent and sulfur/sulfide as the positive electrode active material.

Figure 5:
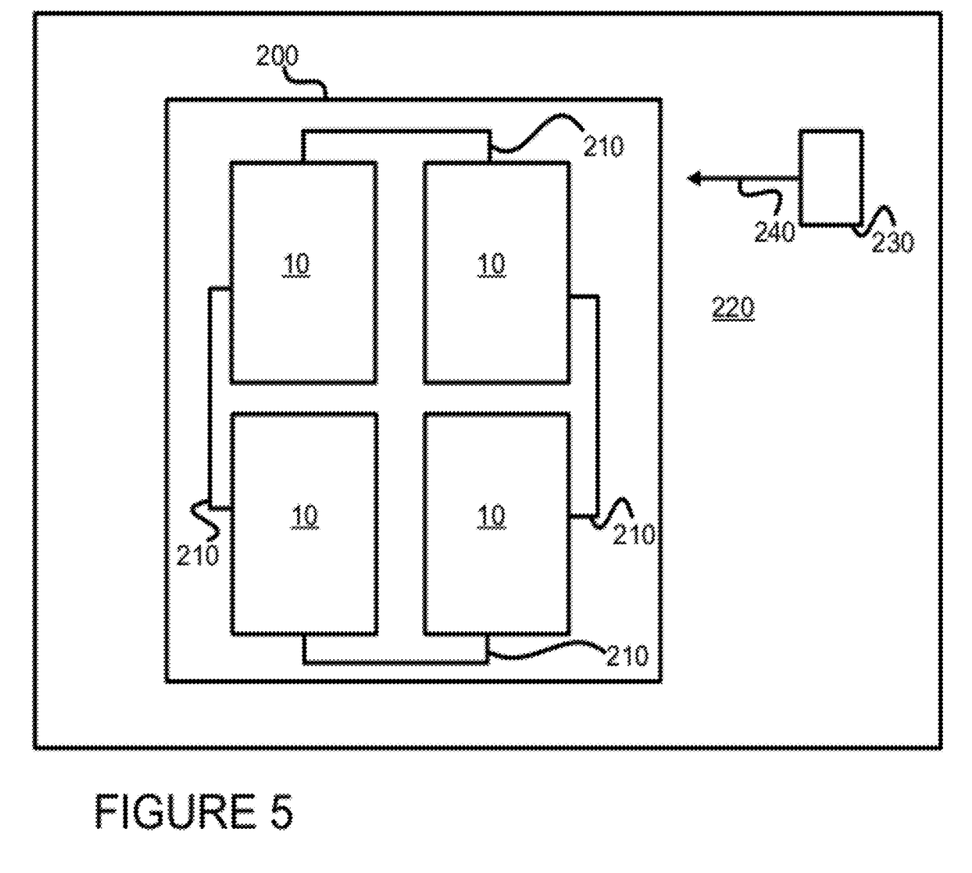
FIG. 5 is a schematic diagram showing how galvanic cells according to the present embodiments may be assembled together to form a battery.

FIG. 5 shows a schematic representation of how the present embodiments of cells 10, 100 may be used to form a battery 200. Specifically, the battery 200 comprises one or more galvanic cells 10. In the embodiment of FIG. 5, the battery 200 includes four (4) of the galvanic cells 10 of FIG. 1. However, those skilled in the art will recognize that the galvanic cells 100 of FIG. 2 could also be used in forming the battery 200. Further, although four (4) galvanic cells 10 are shown in the battery 200, this disclosure is not limiting. Any number of galvanic cells 10 may be used to form the battery 200, as desired. In other words, the battery 200 may comprise one or more galvanic cells (either galvanic cells 10 or galvanic cells 100). As shown in FIG. 5, the one or more galvanic cells 10 may be electrically connected via connections 210. Those skilled in the art will appreciate how to connect the cells 10 so that a functioning battery 200 is created.

As noted herein, the battery 200 (and the galvanic cells 10 or 100) are designed such that they may be operated at higher temperatures. For example, in some embodiments, the cells 10, 100 are designed such that they are operated (and/or are maintained) at temperatures between about 185° C. and about 250° C. (if, for example, the negative electrode metal is lithium). In other embodiments, the cells 10, 100 are designed such that they are operated (and/or are maintained) between about 100° C. and about 200° C. (if, for example, the negative electrode metal is sodium). In further embodiments, the cells 10, 100 are designed such that they are operated (and/or are maintained) between about 100° C. and about 185° C. (if, for example, the negative electrode metal is sodium). In order to have the cell/battery operate at these elevated temperatures, the battery 200 may be positioned in an elevated temperature environment 220. In order to generate these higher temperatures, a heat generator 230 may produce heat 240 which is directed at the battery 200 so that the battery 200 may be operated (charged, discharged and/or used to store power) at the desired elevated temperature. Of course, the embodiment of FIG. 5 is shown for exemplary purposes only. Those skilled in the art will appreciate how the battery 200 and/or the cells 10, 100 could be used, maintained and/or operated at temperatures above room temperature.

Figure 6:
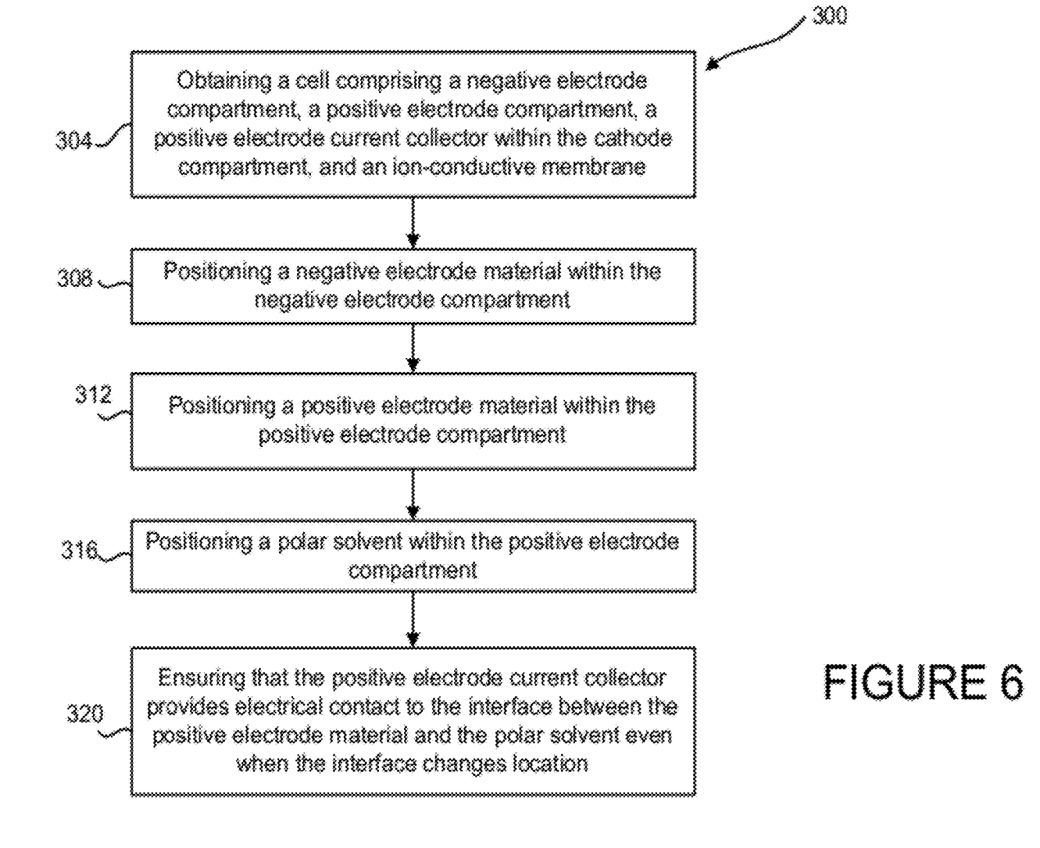
FIG. 6 is a flow diagram showing an exemplary method of constructing a galvanic cell.

Referring now to FIG. 6, an exemplary embodiment of a method 300 for forming a galvanic cell is illustrated. The method involves obtaining 304 a cell. The cell may be the cell 10 or the cell 100 (or other embodiments). As noted herein, the cell may comprise a negative electrode compartment and a positive electrode compartment. The cell may also comprise an ion-conductive membrane that may separate the negative electrode compartment from the positive electrode compartment. Further, the cell may comprise a positive electrode current collector. The positive electrode current collector may be positioned within the positive electrode compartment.

A negative electrode material may be positioned 308 within the negative electrode compartment. The negative electrode material may comprise lithium or sodium metal. The negative electrode material may be molten lithium metal or molten sodium metal. In other embodiments, the negative electrode material comprises lithium or sodium metal in its solid form that is heated to form liquid lithium or sodium metal. A positive electrode active material is positioned 312 within the positive electrode compartment. The positive electrode active material may comprise iodine or sulfur. A polar solvent may also be positioned 316 within the positive electrode compartment. The positive electrode active material may have a specific gravity that is greater than the specific gravity of the polar solvent. Accordingly, when both the positive electrode active material and the polar solvent are positioned in the positive electrode compartment, the positive electrode active material will be positioned near the bottom of the positive electrode compartment (e.g., below the polar solvent). Further, the method 300 may involve ensuring 320 that the positive electrode current collector provides electrical contact to the interface between the positive electrode active material and the polar solvent within the positive electrode compartment. The current collector provides electrical contact to the interface even when the interface changes location.

It should be noted that the steps of the method 300 are exemplary and that the various steps of the method may be performed in a different order than that which is shown in FIG. 6. Such embodiments which have a different ordering of steps fall within the scope of the present embodiments.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

The invention claimed is:

1. A cell comprising:
   a negative electrode compartment housing a negative electrode material, wherein the negative electrode material comprises at least one of a liquid sodium metal and a liquid lithium metal that is oxidized during discharge of the cell;
   a positive electrode compartment;
   a polar solvent within the positive electrode compartment;
   a liquid positive electrode active material within the positive electrode compartment that is reduced during discharge of the cell, wherein the liquid positive electrode active material has a specific gravity greater than the polar solvent such that an interface exists between the liquid positive electrode active material and the polar solvent, wherein the liquid positive electrode active material comprises at least one of elemental sulfur and iodine;
   an ion-conductive membrane comprising at least one of NaSICON and LiSICON separator separating the negative electrode compartment from the positive electrode compartment; and
   a positive electrode current collector configured to provide electrical contact to the interface between the liquid positive electrode active material and the polar solvent, wherein the interface between the liquid positive electrode active material and the polar solvent moves with respect to the positive electrode current collector as the cell charges or discharges;
   wherein the cell is a galvanic cell.

2. The cell as in claim 1 wherein the negative electrode material comprises lithium and the liquid positive electrode active material comprises elemental sulfur and the temperature of the galvanic cell is maintained between about 185° C. and about 250° C.

3. The cell as in claim 1 wherein the negative electrode material comprises sodium and the temperature of the cell is maintained between about 100° C. and about 200° C.

4. The cell as in claim 3, wherein the temperature of the galvanic cell is maintained between about 100° C. and about 185° C.

5. The cell as in claim 3, wherein the temperature of the galvanic cell is maintained between about 110° C. and about 170° C.

6. The cell as in claim 1 wherein the polar solvent comprises at least one of acetamide, methylacetamide, and dimethylacetamide, N-methyl formamide (NMF), formamide, dimethylformamide, tetraglyme, diglyme, dimethylether, Ethanolammonium nitrate, imidazolium halogenoaluminate salts and combinations thereof.

7. The cell as in claim 1 wherein the galvanic cell is configured to allow the polar solvent to leave the galvanic cell and re-enter the galvanic cell as the galvanic cell charges or discharges.

8. The cell as in claim 7 wherein the galvanic cell is configured to allow an inert gas in a headspace within the negative electrode compartment to leave the galvanic cell and re-enter the galvanic cell as the galvanic cell charges or discharges.

9. The cell as in claim 1 wherein the galvanic cell is configured to allow liquids within the positive electrode compartment to leave the galvanic cell and re-enter the galvanic cell as the galvanic cell charges or discharges.

10. The cell as in claim 1 wherein the ion-conductive membrane is planar or tubular.

11. The cell as in claim 1, wherein the positive electrode current collector comprises one or more fins extending upward from a base of the positive electrode compartment.

12. The cell as in claim 11, wherein the height of the fins is designed such that, even when the cell is fully charged or discharged, the height of the interface does not exceed the height of the fins.

13. The cell as in claim 12, wherein the fins comprise one or more holes.

14. A battery comprising one or more galvanic cells, wherein each cell comprises:
   a negative electrode compartment comprising a negative electrode material, wherein the negative electrode comprises at least one of liquid sodium metal and liquid lithium metal that is oxidized during discharge of the galvanic cell;
   a positive electrode compartment;
   a polar solvent within the positive electrode compartment;
   a liquid positive electrode active material within the positive electrode compartment that is reduced during discharge of the galvanic cell, wherein the liquid positive electrode active material comprises elemental sulfur or iodine, wherein the liquid positive electrode active material has a specific gravity greater than the polar solvent such that an interface exists between the liquid positive electrode active material and the polar solvent;
   an ion-conductive membrane comprising at least one of NaSICON and LiSICON separating the negative electrode from the polar solvent; and
   a positive electrode current collector configured to provide electrical contact to the interface between the liquid positive electrode active material and the polar solvent, wherein the interface between the liquid positive electrode active material and the polar solvent moves with respect to the positive electrode current collector as the galvanic cell charges or discharges; and
   wherein the galvanic cell is configured to allow liquid polar solvent within the positive electrode compartment to leave the galvanic cell and re-enter the galvanic cell as the galvanic cell charges or discharges.

15. The battery as is claim 14, wherein the polar solvent comprises:
   at least one of acetamide, methylacetamide, and dimethylacetamide, N-methyl formamide (NMF), formamide, dimethylformamide, tetraglyme, diglyme, dimethylether, Ethanolammonium nitrate, imidazolium halogenoaluminate salts and combinations thereof;
   wherein the ion-conductive membrane is either tubular or planar.

16. The battery as in claim 15 wherein negative electrode material comprises sodium and the temperature of the galvanic cell is maintained between about 100° C. and about 200° C.

17. A cell comprising:
   a negative electrode compartment housing a negative electrode material, wherein the negative electrode material comprises at least one of a liquid sodium metal and a liquid lithium metal that is oxidized during discharge of the cell;
   a positive electrode compartment;
   a polar solvent within the positive electrode compartment;
   a liquid positive electrode active material within the positive electrode compartment that is reduced during discharge of the cell, wherein the liquid positive electrode active material has a specific gravity greater than the polar solvent such that an interface exists between the liquid positive electrode active material and the polar solvent, wherein the liquid positive electrode active material comprises at least one of elemental sulfur and iodine;

an ion-conductive membrane comprising at least one of NaSICON and LiSICON separating the negative electrode compartment from the positive electrode compartment;

a positive electrode current collector configured to provide electrical contact to the interface between the liquid positive electrode active material and the polar solvent, wherein the interface between the liquid positive electrode active material and the polar solvent moves with respect to the positive electrode current collector as the cell charges or discharges;

wherein:

the cell is a galvanic cell configured to allow the liquid polar solvent to leave the galvanic cell and re-enter the galvanic cell as the galvanic cell charges or discharges; and the galvanic cell comprises an inert gas in a headspace within the negative electrode compartment, and wherein the galvanic cell is configured to allow the inert gas to leave the galvanic cell and re-enter the galvanic cell as the galvanic cell charges or discharges.

18. The cell as in claim 1, wherein elemental sulfur has the formula $S_8$.

19. The cell as in claim 1, wherein elemental sulfur has the formula $S_y$, wherein $1 \leq y \leq 30$.

* * * * *

UNITED STATES PATENT AND TRADEMARK OFFICE
CERTIFICATE OF CORRECTION

PATENT NO.       : 10,170,798 B2
APPLICATION NO.  : 13/307123
DATED            : January 1, 2019
INVENTOR(S)      : John Howard Gordon and Javier Alvare It is certified that error appears in the above-identified patent and that said Letters Patent is hereby corrected as shown below:

In the Claims

Claim 1, Column 13, Line 31 delete "(wherein the cell is a galvanic cell.)" and insert -- (wherein the cell is a rechargeable galvanic cell.) --.

Claim 3, Column 13, Line 39 delete "(material comprises sodium and the temperature of the cell is)" and insert -- (material comprises sodium and the temperature of the galvanic cell is) --.

Claim 14, Column 14, Line 11 delete "(wherein each cell comprises:)" and insert -- (wherein each galvanic cell comprises:) --.

Claim 15, Column 14, Line 48 delete "(enoaluminate salts and combinations thereof;)" and insert -- (enoaluminate salts and combinations thereof; and) --.

Claim 17, Column 15, Line 17 delete "(the cell is a galvanic cell)" and insert -- (the cell is a rechargeable galvanic cell) --.

Signed and Sealed this
Thirty-first Day of March, 2020

Andrei Iancu
*Director of the United States Patent and Trademark Office*